United States Patent
Lee et al.

(10) Patent No.: US 12,058,587 B2
(45) Date of Patent: Aug. 6, 2024

(54) INITIATING COMMUNICATION ON MOBILE DEVICE RESPONSIVE TO EVENT

(71) Applicant: International Business Machines Corporation, Armonk, NY (US)

(72) Inventors: Kristen Zelenka Lee, Austin, TX (US); Naga ManojKasyap Chilakamarthy Venkata, Austin, TX (US); Natalie Watkins, Austin, TX (US); Zachary A. Silverstein, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 208 days.

(21) Appl. No.: 17/457,616

(22) Filed: Dec. 3, 2021

(65) Prior Publication Data

US 2023/0179952 A1  Jun. 8, 2023

(51) Int. Cl.
*H04W 4/90* (2018.01)
*H04W 4/029* (2018.01)

(52) U.S. Cl.
CPC ............ *H04W 4/029* (2018.02); *H04W 4/90* (2018.02)

(58) Field of Classification Search
CPC ................................ H04W 4/029; H04W 4/90
See application file for complete search history.

(56) References Cited

U.S. PATENT DOCUMENTS

| 6,195,557 | B1 | 2/2001 | Havinis |
| 6,505,048 | B1 | 1/2003 | Moles |
| 7,221,928 | B2 | 5/2007 | Laird |
| 7,327,280 | B2 | 2/2008 | Bachelder |
| 7,577,420 | B2 | 8/2009 | Srinivasan |
| 7,996,016 | B2 | 8/2011 | Ishii |
| 8,059,789 | B2 | 11/2011 | Hines |
| 8,653,963 | B2 | 2/2014 | Vallaire |
| 9,135,808 | B2 | 9/2015 | Johnson |
| 9,615,204 | B1 | 4/2017 | Haney |
| 2018/0176362 | A1 | 6/2018 | Cohen |
| 2019/0019038 | A1 | 1/2019 | Sloo |

(Continued)

FOREIGN PATENT DOCUMENTS

| CN | 1535040 A | 10/2004 |
| CN | 111060930 A | 4/2020 |

(Continued)

OTHER PUBLICATIONS

International Search Report and Written Opinion for International Application No. PCT/CN2022/123753, International Filing Date: Oct. 8, 2022, Date of Mailing: Nov. 29, 2022, 9 pages.

(Continued)

*Primary Examiner* — Marcos L Torres
(74) *Attorney, Agent, or Firm* — Michael A. Petrocelli

(57) ABSTRACT

Automatically initiating electronic communication including location sharing on a device in response to detecting a risk situation by initiating an emergency protocol on a mobile device in response to detecting by the mobile device a high risk situation. A setting is changed on the mobile device, as part of the emergency protocol, wherein the detection of the high risk situation is based on data received at the mobile device regarding a person using the mobile device. The setting including enabling location sharing for the device.

20 Claims, 8 Drawing Sheets

(56) References Cited

U.S. PATENT DOCUMENTS

2019/0019401 A1\* 1/2019 Han ....................... G08B 25/14
2020/0274962 A1\* 8/2020 Martin .................... H04W 4/90

FOREIGN PATENT DOCUMENTS

| CN | 113678139 A | 11/2021 |
|----|-------------|---------|
| EP | 3796282 A2  | 3/2021  |
| KR | 101440362 B1 | 9/2014 |

OTHER PUBLICATIONS

EMS1 Staff, "New smartwatch engages user and notifies first responders", Jul. 20, 2018, 2 pages, <https://www.ems1.com/ems-products/technology/articles/new-smartwatch-engages-user-and-notifies-first-responders-ch6nzQX9DK1svUFq/>.

Mell, et al., "The NIST Definition of Cloud Computing", National Institute of Standards and Technology, Special Publication 800-145, Sep. 2011, 7 pages.

\* cited by examiner

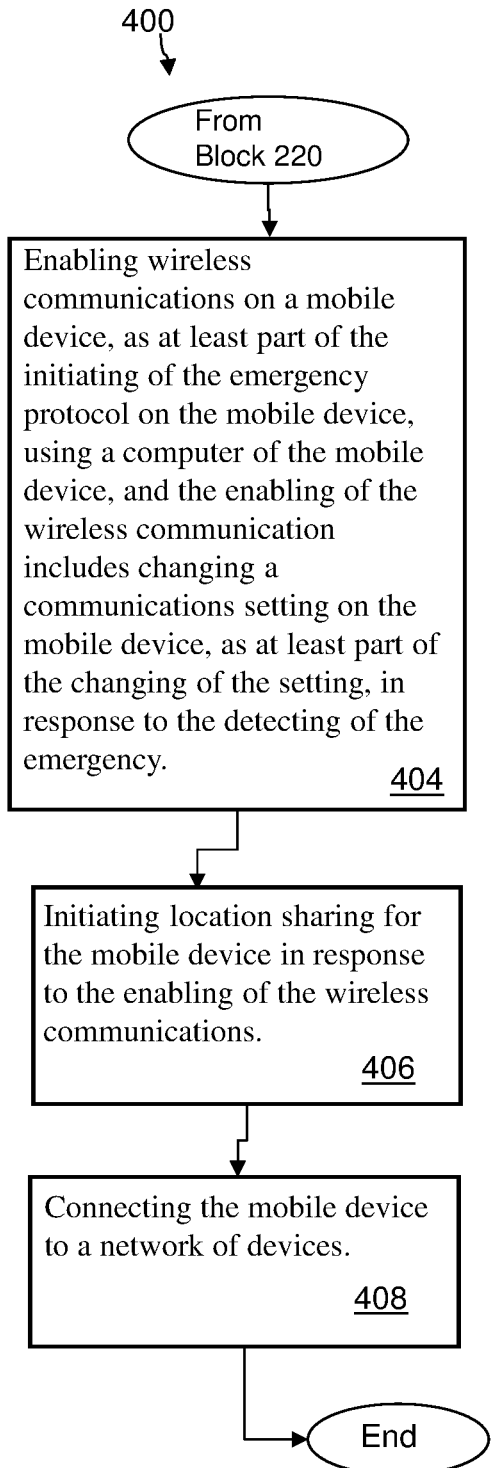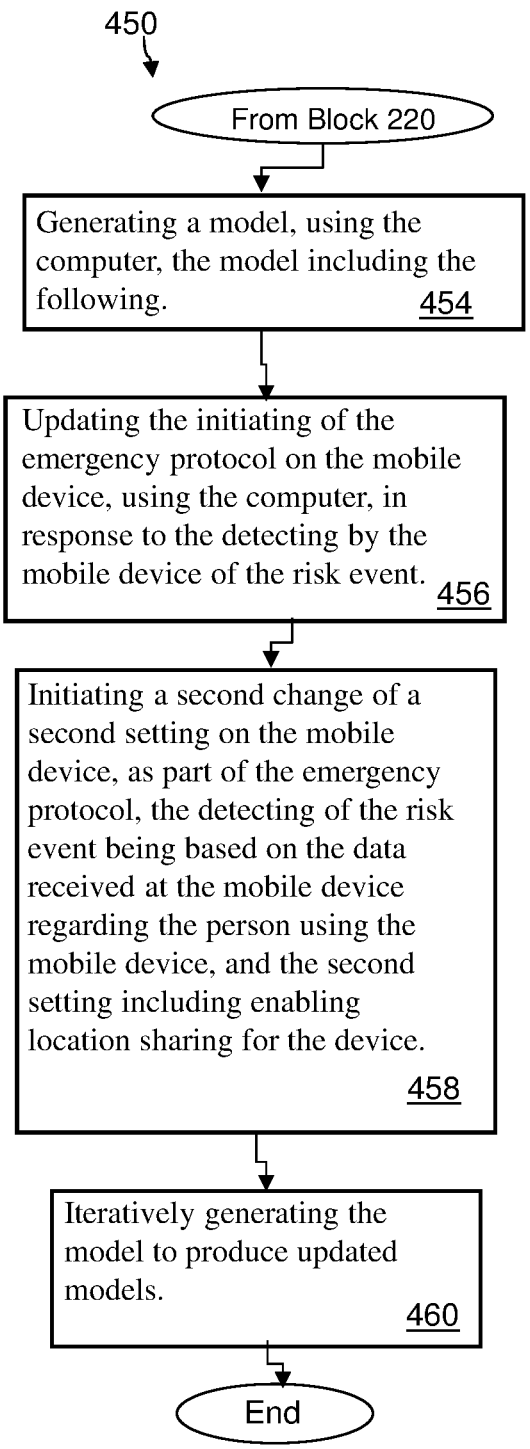
FIG. 4A
FIG. 4B

INITIATING COMMUNICATION ON MOBILE DEVICE RESPONSIVE TO EVENT

BACKGROUND

The present disclosure relates to initiating an action on a smart and/or mobile device, in response to detecting an event.

A response to an event can include an emergency event requiring attention. For example, a natural disaster or an emergency can frequently be a challenge for emergency response personnel to identify the size and scope of an event. Many people have or wear smart devices including smart watches and wearable smart devices. These devices can provide an opportunity to locate a device and the user, which can provide useful information for first responders to immediately understand a situation.

SUMMARY

The present disclosure recognizes the shortcomings and problems associated with current techniques for initiating an action on a smart and/or mobile device, in response to detecting an event, for example, in response to a risk situation or emergency event.

The present disclosure includes initiating in a risk situation, open communication and location sharing on a device, and in one example, in response to detecting a risk situation, opening communication and changing the configuration on a smart device and/or a mobile device to location sharing.

In one example, a method and system according to the present invention, can include when an emergency event occurs, a user device may often not be sharing location information. In this situation, when the emergency event occurs, a first responders or a designated contact, could be notified which can benefit the user by providing a microlocation of the user. Also, first responders can assess location data from one or more users to determine an event effect an area or group of people.

Thus, a method and system according to the present invention can include detecting user emergency situations based on indicators at an individual and aggregate level on mobile devices, and in response initiate security and connection protocols (such as enabling Wi-Fi®, and frequently private communication channels). Wi-Fi® is any "wireless local area network (WLAN) products that are based on the Institute of Electrical and Electronics Engineers' (IEEE) 802.11 standards.

In an aspect according to the present invention, a computer-implemented method for automatically initiating electronic communications includes location sharing on a device in response to detecting a risk situation which includes initiating an emergency protocol on a mobile device, using a computer, in response to detecting by the mobile device a risk event. The method includes changing a setting on the mobile device, as part of the emergency protocol, and the detecting of the risk event is based on data received at the mobile device regarding a person using the mobile device. The setting includes enabling location sharing for the device.

In a related aspect, the setting can be a communications setting, and the changing of the communications setting enables wireless communication by the mobile device, in response to the detecting of the risk event.

In a related aspect, the risk event is an emergency situation.

In a related aspect, the emergency protocol can include turning on a light on the mobile device or activating an audible sound on the mobile device.

In a related aspect, the data can be derived from one or more sensors and the one or more sensors include biometric sensors and the data includes biometric data for the person.

In a related aspect, the data for detecting the emergency is local data from one or more local sensors on the mobile device.

In a related aspect, one of the sensors of the one or more sensors is an accelerometer and the local data includes accelerometer data.

In a related aspect, the data is derived from one or more remote sensors remote from the mobile device.

In a related aspect, the method further including pushing a command, by a remote system communicating with the mobile device, to the mobile device to change the setting on the mobile device.

In a related aspect, the method further including pushing a command, by a remote system communicating with the mobile device, to the mobile device to change the setting on the mobile device to allow wireless communication with the mobile device over the wireless system in response to the remote system detecting an emergency.

In a related aspect, the method further including changing a setting on the mobile device for audible sounds or visual effects to activate a sound or a light from the mobile device.

In a related aspect, the setting is a communications setting, and the changing of the communications setting allows wireless communication with the mobile device, in response to the detecting of the emergency; and connecting the mobile device to a network of devices.

In a related aspect, the method including determining a location of the mobile device using a wireless communication signal of the mobile device.

In a related aspect, the method further including determining a location of the mobile device using a wireless communications signal of the mobile device; and initiating communication between the mobile device and a remote system based on the wireless communication signal.

In a related aspect, the communication between the mobile device and the remote system includes activating voice communications allowing the person to verbally communicate with a remote operator.

In a related aspect, the method further including enabling wireless communications on a mobile device, as at least part of the initiating of the emergency protocol on the mobile device, using a computer of the mobile device. The enabling of the wireless communication includes changing a communications setting on the mobile device, as at least part of the changing of the setting, in response to the detecting of the emergency. The method includes initiating location sharing for the mobile device in response to the enabling of the wireless communications; and connecting the mobile device to a network of devices.

In a related aspect, the method further including generating a model, using the computer; the model including the following; updating the initiating of the emergency protocol on the mobile device, using the computer, in response to the detecting by the mobile device of the risk event; and initiating a second change of a second setting on the mobile device, as part of the emergency protocol, the detecting of the risk event being based on the data received at the mobile device regarding the person using the mobile device, and the second setting including enabling location sharing for the device.

In a related aspect, the method further including iteratively generating the model to produce updated models.

In another aspect according to the present invention, a system for automatically initiating electronic communications including location sharing on a device in response to detecting a risk situation. The system includes a computer system comprising; a computer processor, a computer-readable storage medium, and program instructions stored on the computer-readable storage medium being executable by the processor, to cause the computer system to perform the following functions to; initiate an emergency protocol on a mobile device, using a computer, in response to detecting by the mobile device a risk event; and change a setting on the mobile device, as part of the emergency protocol, the detecting of the risk event being based on data received at the mobile device regarding a person using the mobile device, and the setting including enabling location sharing for the device.

In another aspect according to the present invention, a computer program product for automatically initiating electronic communications including location sharing on a device in response to detecting a risk situation. The computer program product comprising a computer readable storage medium having program instructions embodied therewith, the program instructions executable by a computer to cause the computer to perform functions, by the computer, comprising the functions to; initiate an emergency protocol on a mobile device, using a computer, in response to detecting by the mobile device a risk event; and change a setting on the mobile device, as part of the emergency protocol, the detecting of the risk event being based on data received at the mobile device regarding a person using the mobile device, and the setting including enabling location sharing for the device.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

FIG. 4A is a flow chart illustrating another method, which continues from the flow chart of FIG. 2, for automatically initiating communication including location sharing on a device in response to detecting a risk situation, according to another embodiment of the present disclosure.

FIG. 4B is a flow chart illustrating another method, which continues from the flow chart of FIG. 2, which includes generating a model used for automatically initiating communication including location sharing on a device in response to detecting a risk situation, according to another embodiment of the present disclosure.

DETAILED DESCRIPTION

The following description with reference to the accompanying drawings is provided to assist in a comprehensive understanding of exemplary embodiments of the invention as defined by the claims and their equivalents. The description includes various specific details to assist in that understanding, but these are to be regarded as merely exemplary, and assist in providing clarity and conciseness. Accordingly, those of ordinary skill in the art will recognize that various changes and modifications of the embodiments described herein can be made without departing from the scope and spirit of the invention. In addition, descriptions of well-known functions and constructions may be omitted.

The terms and words used in the following description and claims are not limited to the bibliographical meanings, but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments and Examples

Embodiments and figures of the present disclosure may have the same or similar components as other embodiments. Such figures and descriptions of illustrate and explain further examples and embodiments according to the present disclosure.

Figure 1:
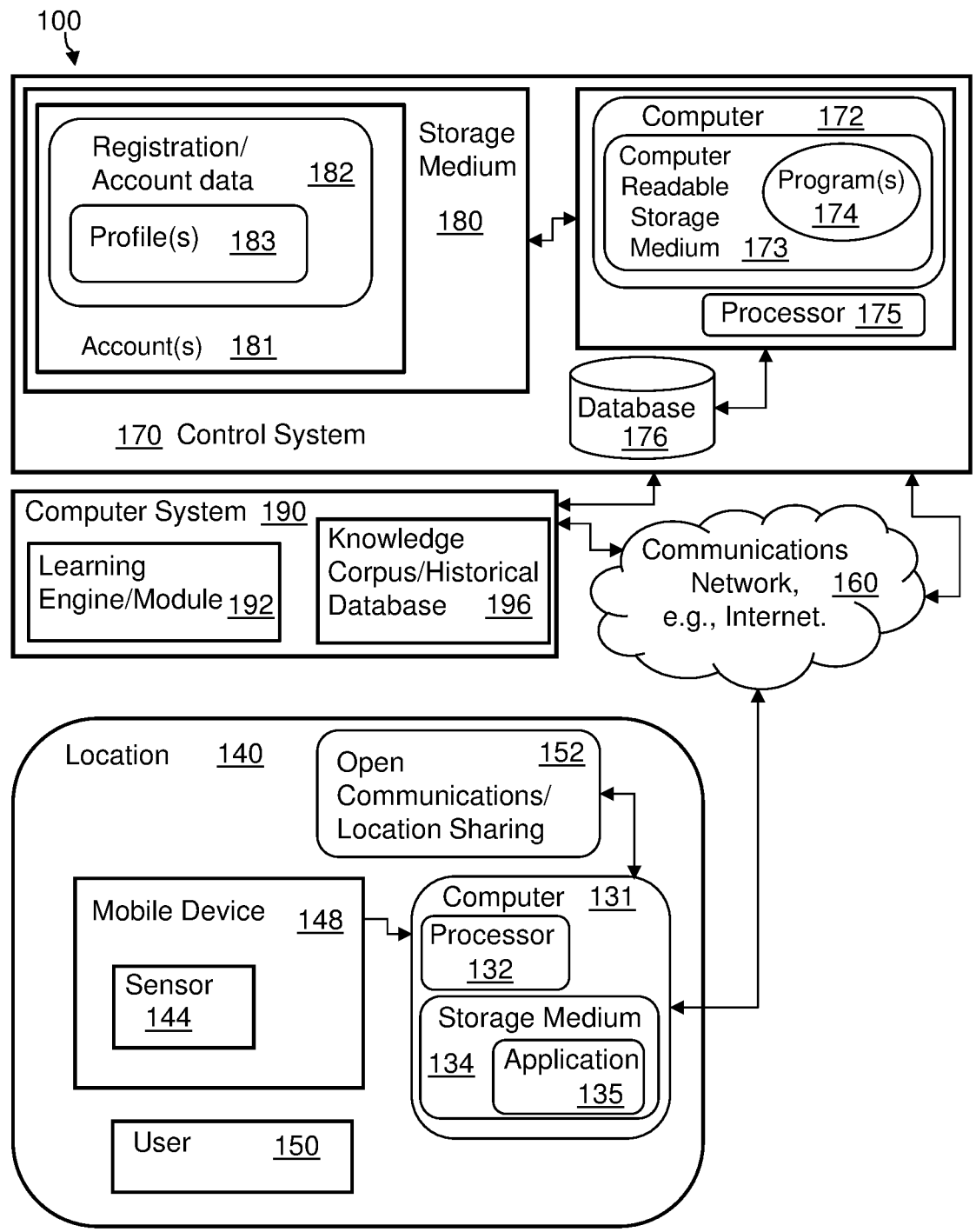
FIG. 1 is a schematic block diagram illustrating an overview of a system, system features or components, and methodology for automatically initiating communication including location sharing on a device in response to detecting a risk situation, according to an embodiment of the present disclosure.
Figure 2:
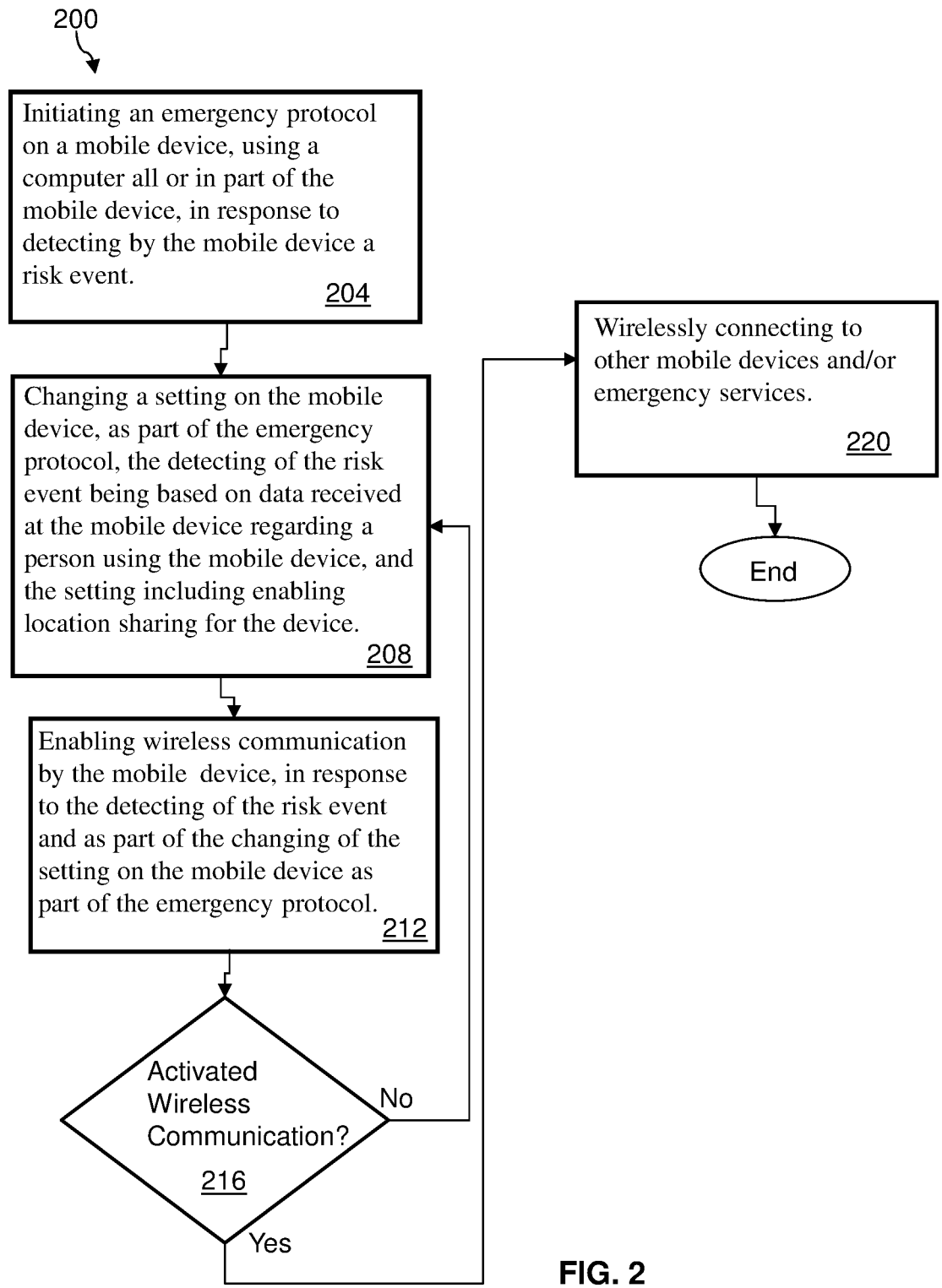
FIG. 2 is a flow chart illustrating a method, implemented using the system shown in FIG. 1, for automatically initiating communication including location sharing on a device in response to detecting a risk situation, according to an embodiment of the present disclosure.
Figure 3:
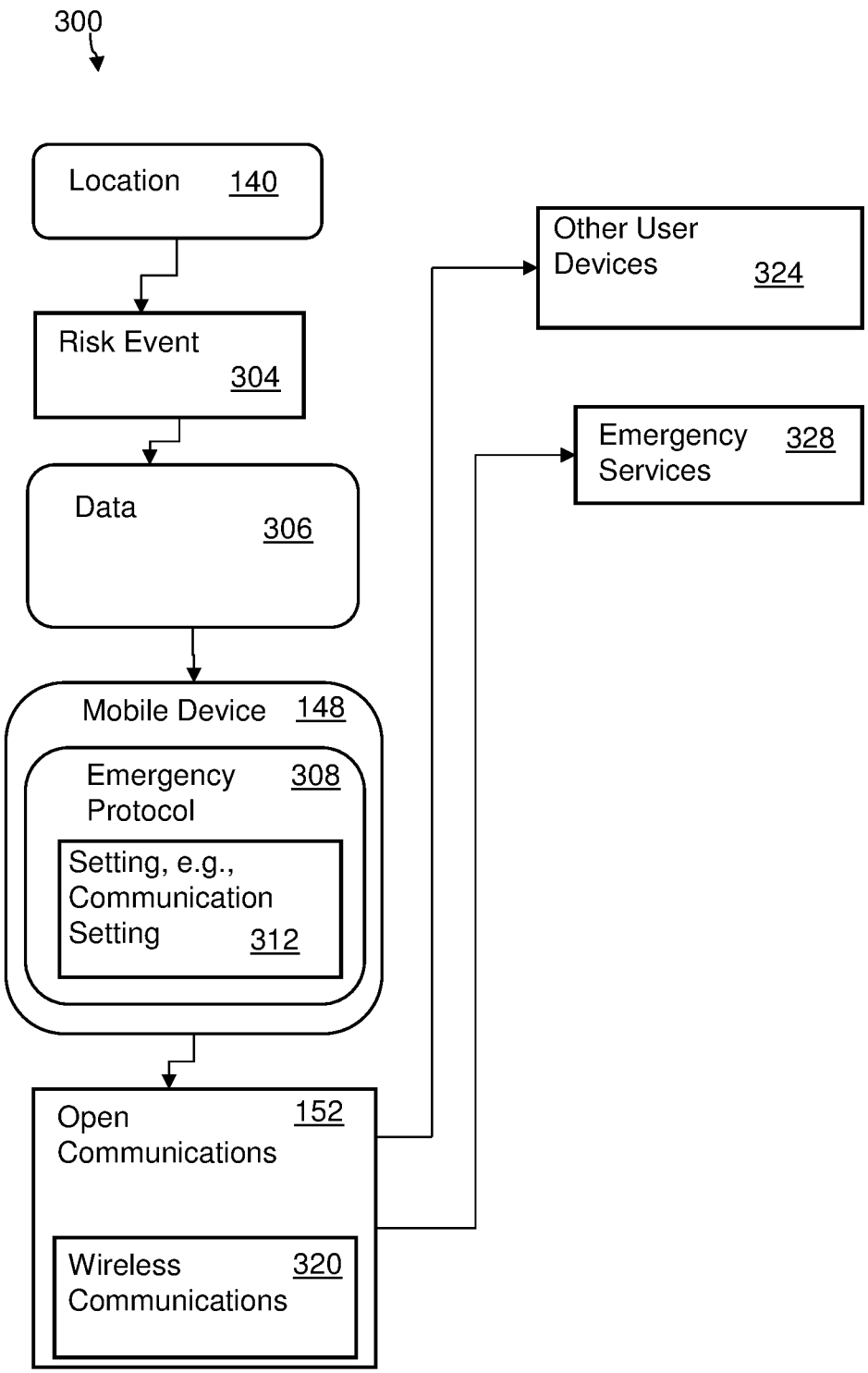
FIG. 3 is a functional schematic block diagram showing a series of operations and functional methodologies, for instructional purposes illustrating functional features of the present disclosure associated with the embodiments shown in the FIGS., which can be implemented, at least in part, in coordination with the system shown in FIG. 1, for automatically initiating communication including location sharing on a device in response to detecting a risk situation.

Referring to FIGS. 1, 2 and 3, according to embodiments of the present disclosure, a computer-implemented method 200 for automatically initiating communication includes location sharing on a device in response to detecting a risk situation and includes features described below. Embodiments of the present disclosure include operational actions and/or procedures. The computer-implemented method 200 includes a series of operational blocks for implementing an embodiment according to the present disclosure which can include the system shown in FIG. 1. The operational blocks of the methods and systems according to the present disclosure can include techniques, mechanism, modules, and the like for implementing the functions of the operations in accordance with the present disclosure.

The method 200 includes initiating an emergency protocol on a mobile device 148, using a computer, all of in part of the mobile device, in response to detecting by the mobile device a risk event 304 at a location 140, as in block 204.

The method 200 includes changing a setting 312 on the mobile device, as part of the emergency protocol 308, and the detecting of the risk event can be based on data 306 received at the mobile device regarding a person/user 150 using the mobile device. The setting can include enabling location sharing for the device, as in block 208.

The method 200 includes enabling wireless communication 320 by the mobile device, e.g., open electronic communications 152, in response to the detecting of the risk event and as part of the changing of the setting on the mobile device as part of the emergency protocol, as in block 212.

When wireless communication is not activated, at block 216, the method can return to block 208. When the wireless communication is activated, as in block 216, the method continues to block 220.

The method includes wirelessly connecting to other mobile devices and/or emergency services, as in block 220.

In one example, the risk event can include an emergency situation. The changing of the communications setting on the mobile device, as at least part of the changing of the setting, can use a computer of the mobile device. The changing of the setting can be at least part of the emergency protocol, and can allow wireless communication with the mobile device, in response to the detecting of the emergency.

In another example, the emergency protocol can include turning on a light on the mobile device or activating an audible sound on the mobile device.

In another example, the data is derived from one or more sensors and the one or more sensors include biometric sensors and the data includes biometric data for the person.

In another example, the data can be derived from one or more sensors which are locally placed in an area of the user.

In another example, the data for detecting the emergency can be local data from one or more local sensors on the mobile device.

In another example, one of the sensors of the one or more sensors can be an accelerometer and the local data can include accelerometer data.

In another example, the data for the detecting of the emergency is at least in part from receiving a communication from a remote system.

In another example, the data is derived from one or more remote sensors remote from the mobile device.

In another example, the method further includes pushing a command, by a remote system communicating with the mobile device, to the mobile device to change the setting on the mobile device.

In another example, the method can further include pushing a command, by a remote system communicating with the mobile device, to the mobile device to change the setting on the mobile device to allow wireless communication with the mobile device over the wireless system in response to the remote system detecting an emergency.

In another example, the method can further include changing a setting on the mobile device for audible sounds or visual effects to activate a sound or a light from the mobile device.

In another example, the setting can be a communications setting, and the changing of the communications setting can allow wireless communication with the mobile device, in response to the detecting of the emergency, and the connecting of the mobile device to a network of devices, e.g., other devices of other users 324. The connection of the mobile device to a network enables location analysis, and emergency communications between devices, for example, a mesh network.

In another example, the determining of the emergency situation can include assessing risk based on the data.

In another example, the determining of the emergency situation can be based on a plurality of risk factors derived from the data.

In another example, the method can further include determining a location of the mobile device using a wireless communication signal of the mobile device.

In another example, the method can further include determining a location of the mobile device using a wireless communications signal of the mobile device, and the method can include initiating communications between the mobile device and a remote system based on the wireless communication signal.

In another example, the communication between the mobile device and the remote system includes activating voice communications allowing the person to verbally communicate with a remote operator. In another example, the remote operator and the user can communicate on an open line.

In another example, the computer can be at least part of the mobile device. In another example, the mobile device can be a wearable device. In another example, the mobile device can be a smart device, or a smart watch.

Referring to FIG. 4A, in another method 400 according to an embodiment of the present disclosure, for automatically initiating communication including location sharing on a device in response to detecting a risk situation can continue from block 220 of the method 200 shown in FIG. 2. The method 400 can include enabling wireless communications on a mobile device. Such enabling can be at least part of the initiating of the emergency protocol on the mobile device, using a computer of the mobile device, and the enabling of the wireless communication includes changing a communications setting on the mobile device, as at least part of the changing of the setting, in response to the detecting of the emergency, as in block 404.

The method 400 includes initiating location sharing for the mobile device in response to the enabling of the wireless communications, as in block 406. The method 400 includes connecting the mobile device to a network of devices, as in block 408. The network of devices can enable location analysis, and emergency communications between devices, such as in a mesh network.

Referring to FIG. 4B, in another method 450 according to an embodiment of the present disclosure, for automatically initiating communication including location sharing on a device in response to detecting a risk situation can continue from block 220 of the method 200 shown in FIG. 2. The method 450 can include generating a model, using the computer, wherein the model can include the following, as in block 454. The method 450 can include updating the initiating of the emergency protocol on the mobile device, using the computer, in response to the detecting by the mobile device of the risk event, as in block 456. The method 450 includes initiating a second change of a second setting on the mobile device, as part of the emergency protocol, the detecting of the risk event being based on the data received at the mobile device regarding the person using the mobile device, and the second setting including enabling location sharing for the device, as in block 458. The method 450 can include iteratively generating the model to produce updated models, as in block 460.

The computer 131 can be integral to or communicating with the robotic device 148 in a device 130. A computer 190 remote from the device 148 can electronically communicate, in all or in part, with the computer 172 as part of the control system 170. The control system can include the computer 172 having a computer readable storage medium 173 which can store one or more programs 174, and a processor 175 for executing program instructions. The control system can also include a storage medium which can include registration and/or account data 182 and profiles 183 of users or entities (such entities can include robotic entities) as part of user accounts 181. User accounts 181 can be stored on a storage medium 180 which is part of the control system 170. The user accounts 181 can include registrations and account data 182 and user profiles 183. The control system can also include a computer 172 having a computer readable storage medium 173 which can store programs or code embedded on the storage medium. The program code can be executed by a processor 175. The computer 172 can communicate with a database 176. The control system 170 can also include a database 176 for storing all or part of such data as described above, and other data.

The control system can also communicate with a computer system 190 which can include a learning engine/module 192 and a knowledge corpus or database 196. The computer system 190 can also communicate with the computer 131 of the device 130 and can be remote from the user device 130. In another example, the computer system 190 can be all or part of the control system, or all or part of the device 130. The depiction of the computer system 190 as well as the other components of the system 100 are shown as one example according to the present disclosure.

The new or different AI (Artificial Intelligence) ecosystem, or technology/communication or IT (Information Technology) ecosystem can include a local communications network 152 which can communicate with the communications network 160. The system 100 can include a learning engine/module 192, which can be at least part of the control system or communicating with the control system, for generating a model or learning model. In one example, the learning model can model workflow in a new AI or IT ecosystem for machine/devices in the new ecosystem.

In another example, the computer 131 can be part of a device 130. The computer can include a processor 132 and a computer readable storage medium 134 where an application 135 can be stored which can in one example, embody all or part of the method of the present disclosure. The application can include all or part of instructions to implement the method of the present disclosure, embodied in code and stored on a computer readable storage medium. The device 148 can include a display. The device 148 can operate, in all or in part, in conjunction with a remote server by way of a communications network 160, for example, the Internet.

In one example, as part of the analysis of received data, the data can be stored in a knowledge corpus and historical database, which can be populated by historical data gathered from sensors.

Other Embodiments and Examples

Referring to FIG. 1, the device 130, also can be referred to as a user device or an administrator's device, includes a computer 131 having a processor 132 and a storage medium 134 where an application 135, can be stored. The application can embody the features of the method of the present disclosure as instructions. The user can connect to a learning engine 192 using the device 130. The device 130 which includes the computer 131 and a display or monitor 138. The application 135 can embody the method of the present disclosure and can be stored on the computer readable storage medium 134. The device 130 can further include the processor 132 for executing the application/software 135. The device 130 can communicate with a communications network 160, e.g., the Internet.

It is understood that the user device 130 is representative of similar devices which can be for other users, as representative of such devices, which can include, mobile devices, smart devices, laptop computers etc.

In one example, the system of the present disclosure can include a control system 170 communicating with the user device 130 via a communications network 160. The control system can incorporate all or part of an application or software for implementing the method of the present disclosure. The control system can include a computer readable storage medium 180 where account data and/or registration data 182 can be stored. User profiles 183 can be part of the account data and stored on the storage medium 180. The control system can include a computer 172 having computer readable storage medium 173 and software programs 174 stored therein. A processor 175 can be used to execute or implement the instructions of the software program. The control system can also include a database 176.

In another example and embodiment, profiles can be saved for entities such as users, participants, operators, human operators, or robotic devices. Such profiles can supply data regarding the user and history of deliveries for analysis. In one example, a user can register or create an account using the control system 170 which can include one or more profiles 183 as part of registration and/or account data 182. The registration can include profiles for each user having personalized data. For example, users can register using a website via their computer and GUI (Graphical User Interface) interface. The registration or account data 182 can include profiles 183 for an account 181 for each user. Such accounts can be stored on the control system 170, which can also use the database 176 for data storage. A user and a related account can refer to, for example, a person, or an entity, or a corporate entity, or a corporate department, or another machine such as an entity for automation such as a system using, in all or in part, artificial intelligence.

Additionally, the method and system is discussed with reference to FIG. 3, which is a functional system 300 which includes components and operations for embodiments according to the present disclosure, and is used herein for reference when describing the operational steps of the methods and systems of the present disclosure. Additionally, the functional system 300, according to an embodiment of the present disclosure, depicts functional operations indicative of the embodiments discussed herein.

Referring to FIG. 3, in one embodiment according to the present disclosure, a system 300 can be used to identify objects related to an event for use regarding the event by using networked computer system resources. In FIG. 3 similar components may have the same reference numerals as the system 100 shown in FIG. 1, the system 300 can include or operate in concert with a computer implemented method as shown in FIGS. 1 and 2.

More Embodiments and Examples

Figure 5:
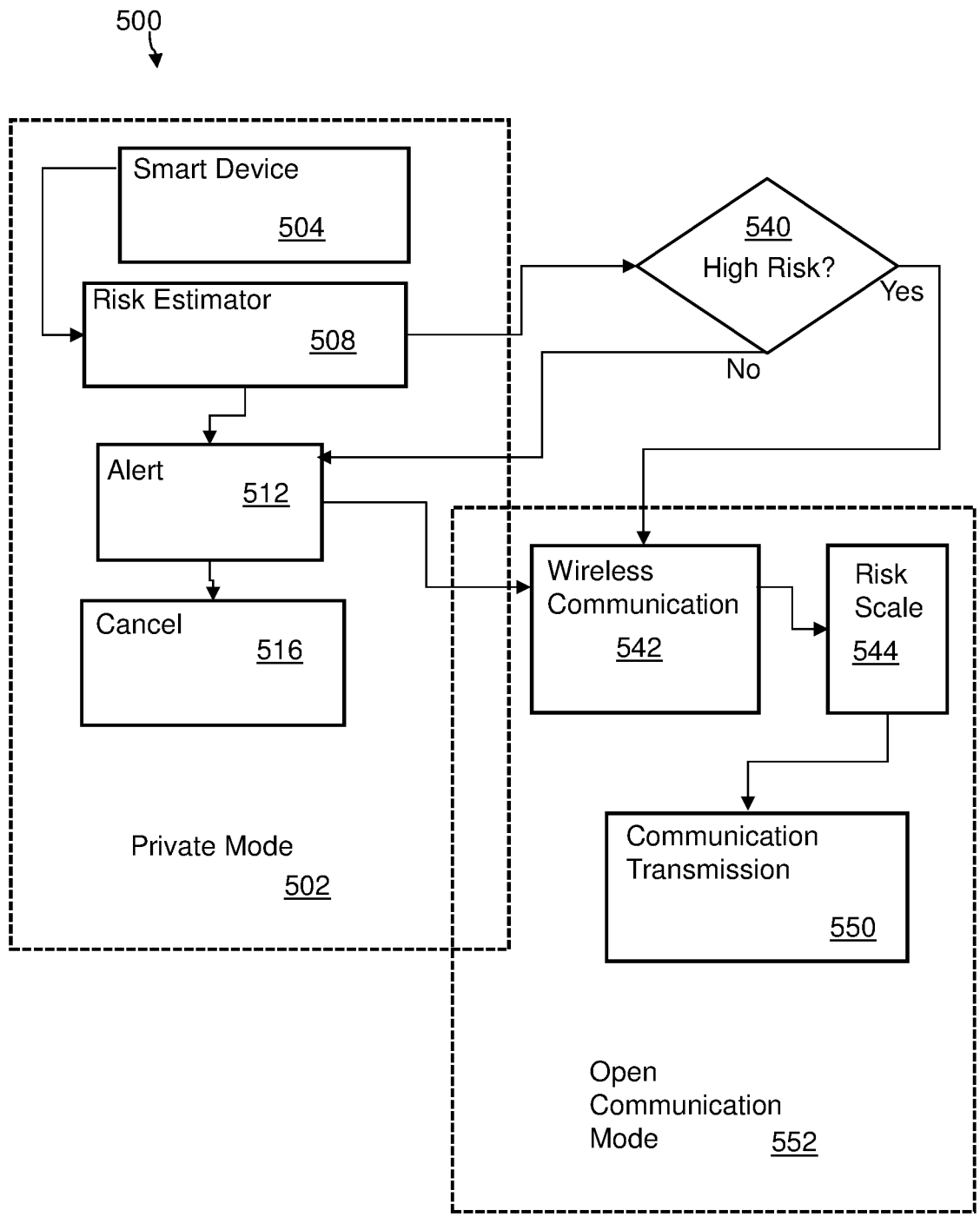
FIG. 5 is a system illustrating another method according to an embodiment of the present invention, for automatically initiating communication including location sharing on a device in response to detecting a risk situation, according to another embodiment of the present disclosure.

Referring to FIG. 5, in one embodiment according to the present disclosure, a system and method 500 for automatically initiating communication including location sharing on a device in response to detecting a risk situation can include a system and method by initiating open communication and location sharing by changing configuration on a device such as a smart device in a risk situation. The system includes a smart device 504 in private mode, that is, where the device is not enabled for wireless communication with other device. The device 504 can use a risk estimator 508 as part of a computer of the device, for estimating risk of a detected event by the device. For example, an event can include a user voice commend, a sudden change detected by a gyroscope, or a biometric change detected by a wearable device. The risk estimator 508 can detect an abnormal activity or other indication of a risk or event or high risk event, and assess the risk situation or event. The system can include initiating an alert 512 if a risk is assessed to be high or meet a threshold, such as a timed threshold of an event which triggers the alert. If the alert threshold is not met, the alert can be canceled 516. In another example, when the system detects an abnormal activity which meets a threshold for immediate action such as a high risk 540, the system can proceed directly to initiate a wireless communication 542. When the system does not ascertain the event or situation as high risk 540, the system can return to determining an alert 512.

Once the system determines that an alert is warranted and initiates an alert 512, the system enables wireless communication 542. The system automatically enables the wireless communication 542 and thus the device is thereby in an open communication mode 552 with wireless communication enabled. The system can assess a scale of risk 544 of the event. In one example, the scale of the risk can be determined by detecting other signals at a location. The system can transmit a communication 550 wherein the communication can include a request for help, a type of event or emergency.

In one example, a method includes determining premature activation of a public emergency mode of a device. A method can include cancelling or confirming activation of an emergency mode for a device. In another example, a method can optionally activate voice recognition so that a user can speak or issue a command to cancel an emergency request. Sensors can include a fingerprint sensor and/or a hardware sensor on a smart watch being able to detect when a smart watch is removed from a user by force, for example, a fall, as well as general authentication so that the device doesn't open communications to the public without authentication. In another example, a module used by the smart device or wearable device can gather specific locational information or detect a response by first responders/emergency services 328 to generate a noise such as a beep or make a sound to expose the user, that is, make it easier for emergency personnel or first responders to find a user.

In one example, in an emergency situation, such as an earthquake, can cause significant damage including a partial building collapse which can leave personnel stranded or injured in a building and in need of help. Many people have smart watches and mobile devices that can utilize the system and method of the present disclosure as a module in their device computer as a series of instructions as part or all of a computer program. Personnel or a user can option in to an alerting and rescue module. For example, the devices that are possessed by an individual can detect a user's biometric heartrate increase, the user yelling help, or the user flailing their arms. An artificial intelligence (AI) module on a device such as a smart watch can detect a user is in an emergency situation and initiates switching a device setting to open communications, e.g., change from private (the default for many users) to open to the public for first responders to detect on open communication channels. The devices can utilize technology like open network communication to publicly display their location and coordinates so locally working first responders can reach them and rescue them if necessary.

In another example, a system and method can include a wearable smart device can be set to automatically monitor for a raised heart rate of a user, and other biometric activity, or sustained movement. In other examples, an accelerometer-gyroscope can detect key movements (such as falling), or an audio sensor can identify key words such as help (or a relevant word of any language), or yelling. The system and method can include a device monitoring activity along with other factors as a background operation. In another example, when an activity passes a certain pre-programmed threshold of time or frequency, the device can recognize an activity abnormal or unusual. Upon realizing an unusual activity, a device can initiate an emergency mode, which can be displayed as an alert on ae graphical user interface (GUI). In one example, a user can have a threshold time to cancel an initiated emergency mode before the device fully activates. A user can cancel a procedure by pressing a pop-up alert on a screen or a button on the device. In one example, when a user action does not occur or a user action intervenes in an initiated emergency mode, a public emergency mode can be activated. A device can use the internet and cell capability to broadcast the device's location and status to public connections. Information can be broadcasted and can include a brief history of user activity surrounding the time period in which a threshold was reached. A specific and detailed alert can be sent to an emergency center, where receivers for such signals can be established. In another example, a notification can include an automated 911 call or a computer alert at a hospital, fire station, emergency service, etc. A device can open communication ports on a device such as open wireless communications which is understood as a reduction in security but allows for open communications. In another example, a device in emergency mode can be recognize by nearby devices also in emergency mode in response to a public broadcast by the device. In this way, a large number of devices in an area can communicate and create a shared larger signal to better reach the nearest emergency center. Emergency centers (such as police stations) can then better predict the nature of an emergency with a large amount of broadcasted user data. An alternative route to activating an emergency mode is a manual activation, in which the user can select to turn on or activate an emergency mode from a device menu. The device can continue in a public emergency mode until manually deactivated by a user's action. Thus, in one example, collection of data can inform more than one user and bulk send or communicate a notification to a population in the emergency zone. Emergency responders can collect data of individuals in an emergency zone to inform emergency responders who can use the data to develop strategies. In one example, a smart mobile device can alert not only other users but also emergency responders to changing conditions of an event. The event can be triggered by a collection of vital signs from a larger population of users that allows for responders to take more informed actions.

A system and method according to the present disclosure can include detecting and modifying user devices in emergency situations from a closed (e.g., non-location sharing, non-broadcasting) mode or manner, to an open manner or open communication mode (e.g., location sharing, screen illuminating, sound making). In one example, rescue personnel may push a command such as through a wireless communication network or a joinable mesh network of devices in an emergency mode. Commands can open devices for communications, activate devices, and provide networking locations or physical locations by manner of sound, flashlight, etc. Thus, embodiments can include a cluster of nearby users and devices in emergency situations, and forming a mesh network. A mesh network can grow in size by the number of devices that have activated emergency mode. The larger mesh network can attempt to triangulate signals, provide a bigger local network for emergency workers to connect to, and thus determine or try to identify if a rescue is needed. A mesh network can also provide metrics about how many people may need rescue and where there devices are broadcasted throughout by passing location service information through the mesh network. In one example, a device can capture wear and usage metrics to attach an attended or unattended flag to the wearables and Internet of Things (IOT) devices. A command can be pushed to an area, or a pre-defined network that users may automatically join (such as a wireless access point) to turn on location services. A device can detect a user in an emergency pattern based on body movement, expressions, etc., and use that as the starting point to automatically activate any indicators available or communication means, such as turning on a sound, light, or making a call, as an alert or emergency mode. In one example, the mode will actuate when a user may yell and then detect fast acceleration of the IOT device based on an IOT accelerometer, and the user not hitting a cancellation button.

In one example, an emergency can be detected in a number of manners. One example, includes manually pushing an alert or emergency mode over a pre-existing wireless network, cellphone tower, or some other communication system. In another example, an emergency can be automatically detected based on speech or an audible command. In another example, an emergency can be automatically detected by hand or arm movement, for example, waving hands in air. In another example, a method and system can automatically detect an emergency mode via biometrics, for instance, a drastic jump in heart rate, etc., and/or automatically detecting via IOT sensors, for instance, an accelerometer, altimeter, and other systems embedded in IOT devices. A combination of the above factors can aid by detecting, in a variety or number of users, significant numbers of emergency interactions on a site. In another example, a system and method can take into account a user's device battery power, cluster of devices, and the changing specifically to a broadcasting mode so that the user may be discoverable in person physically with other devices, thereby the user's normal privacy protection of location is overridden in an emergency.

More Examples and Embodiments

Operational blocks and system components shown in one or more of the figures may be similar to operational blocks and system components in other figures. The diversity of operational blocks and system components depict example embodiments and aspects according to the present disclosure. For example, methods shown are intended as example embodiments which can include aspects/operations shown and discussed previously in the present disclosure, and in one example, continuing from a previous method shown in another flow chart.

Additional Examples and Embodiments

Figure 6:
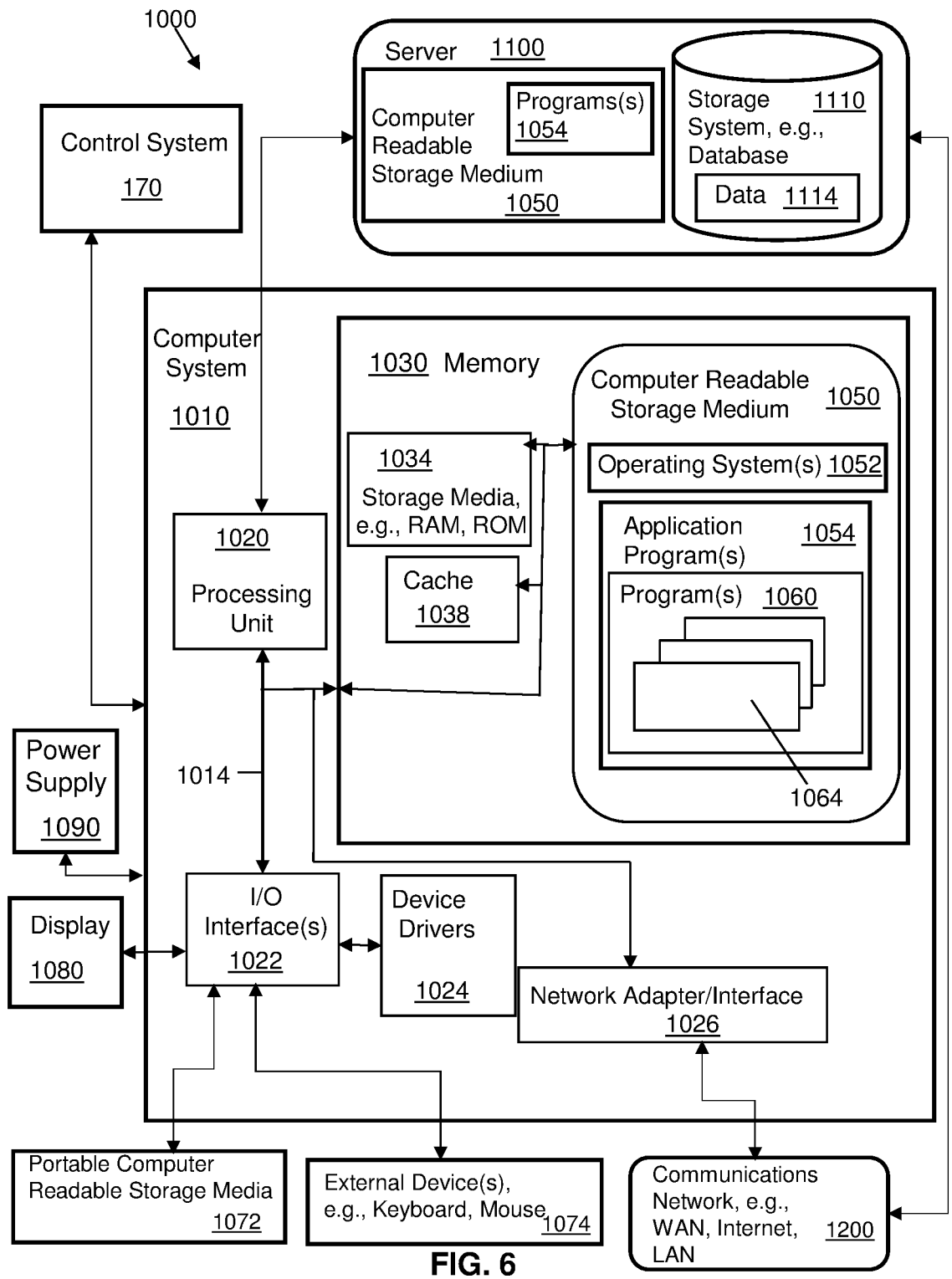
FIG. 6 is a schematic block diagram depicting a computer system according to an embodiment of the disclosure which may be incorporated, all or in part, in one or more computers or devices shown in FIG. 1, and cooperates with the systems and methods shown in the FIGS.

In the embodiment of the present disclosure shown in FIGS. 1 and 2, a computer can be part of a remote computer or a remote server, for example, remote server 1100 (FIG. 6). In another example, the computer 131 can be part of a control system 170 and provide execution of the functions of the present disclosure. In another embodiment, a computer can be part of a mobile device and provide execution of the functions of the present disclosure. In still another embodiment, parts of the execution of functions of the present disclosure can be shared between the control system computer and the mobile device computer, for example, the control system function as a back end of a program or programs embodying the present disclosure and the mobile device computer functioning as a front end of the program or programs.

The computer can be part of the mobile device, or a remote computer communicating with the mobile device. In another example, a mobile device and a remote computer can work in combination to implement the method of the present disclosure using stored program code or instructions to execute the features of the method(s) described herein. In one example, the device 130 can include a computer 131 having a processor 132 and a storage medium 134 which stores an application 135, and the computer includes a display 138. The application can incorporate program instructions for executing the features of the present disclosure using the processor 132. In another example, the mobile device application or computer software can have program instructions executable for a front end of a software application incorporating the features of the method of the present disclosure in program instructions, while a back end program or programs 174, of the software application, stored on the computer 172 of the control system 170 communicates with the mobile device computer and executes other features of the method. The control system 170 and the device (e.g., mobile device or computer) 130 can communicate using a communications network 160, for example, the Internet.

Thereby, the method 100 according to an embodiment of the present disclosure, can be incorporated in one or more computer programs or an application 135 stored on an electronic storage medium 134, and executable by the processor 132, as part of the computer on mobile device. For example, a mobile device can communicate with the control system 170, and in another example, a device such as a video feed device can communicate directly with the control system 170. Other users (not shown) may have similar mobile devices which communicate with the control system similarly. The application can be stored, all or in part, on a computer or a computer in a mobile device and at a control system communicating with the mobile device, for example, using the communications network 160, such as the Internet. It is envisioned that the application can access all or part of program instructions to implement the method of the present disclosure. The program or application can communicate with a remote computer system via a communications network 160 (e.g., the Internet) and access data, and cooperate with program(s) stored on the remote computer system. Such interactions and mechanisms are described in further detail herein and referred to regarding components of a computer system, such as computer readable storage media, which are shown in one embodiment in FIG. 7 and described in more detail in regards thereto referring to one or more computer systems 1010.

Thus, in one example, a control system 170 is in communication with the computer 131 or device 130, and the computer can include the application or software 135. The computer 131, or a computer in a mobile device 130 communicates with the control system 170 using the communications network 160.

In another example, the control system 170 can have a front-end computer belonging to one or more users, and a back-end computer embodied as the control system.

Also, referring to FIG. 1, a device 130 can include a computer 131, computer readable storage medium 134, and operating systems, and/or programs, and/or a software application 135, which can include program instructions executable using a processor 132. These features are shown herein in FIG. 1, and other similar components and features are also in an embodiment of a computer system shown in FIG. 6 referring to a computer system 1010, which may include one or more computer components.

The method according to the present disclosure, can include a computer for implementing the features of the method, according to the present disclosure, as part of a control system. In another example, a computer as part of a control system can work in corporation with a mobile device computer in concert with communication system for implementing the features of the method according to the present disclosure. In another example, a computer for implementing the features of the method can be part of a mobile device and thus implement the method locally.

Specifically, regarding the control system 170, a device(s) 130, or in one example devices which can belong to one or more users, can be in communication with the control system 170 via the communications network 160. In the embodiment of the control system shown in FIG. 1, the control system 170 includes a computer 172 communicating with a database 176 and one or more programs 174 stored on a computer readable storage medium 173. In the embodiment of the disclosure shown in FIG. 1, the device 130 communicates with the control system 170 and the one or more programs 174 stored on a computer readable storage medium 173. The control system includes the computer 172 having a processor 175, which also has access to the database 176.

The control system 170 can include a storage medium 180 for maintaining a registration 182 of users and their devices for analysis of the audio input. Such registration can include user profiles 183, which can include user data supplied by the users in reference to registering and setting-up an account. In an embodiment, the method and system which incorporates the present disclosure includes the control system (generally referred to as the back-end) in combination and cooperation with a front end of the method and system, which can be the application 135. In one example, the application 135 is stored on a device, for example, a computer or device on location, and can access data and additional programs at a back end of the application, e.g., control system 170.

The control system can also be part of a software application implementation, and/or represent a software application having a front-end user part and a back-end part providing functionality. In an embodiment, the method and system which incorporates the present disclosure includes the control system (which can be generally referred to as the back-end of the software application which incorporates a part of the method and system of an embodiment of the present application) in combination and cooperation with a front end of the software application incorporating another part of the method and system of the present application at the device, as in the example shown in FIG. 1 of a device 130 and computer 131 having the application 135. The application 135 is stored on the device or computer and can access data and additional programs at the back end of the application, for example, in the program(s) 174 stored in the control system 170.

The program(s) 174 can include, all or in part, a series of executable steps for implementing the method of the present disclosure. A program, incorporating the present method, can be all or in part stored in the computer readable storage medium on the control system or, in all or in part, on a computer or device 130. It is envisioned that the control system 170 can not only store the profile of users, but in one embodiment, can interact with a website for viewing on a display of a device such as a mobile device, or in another example the Internet, and receive user input related to the method and system of the present disclosure. It is understood that FIG. 1 depicts one or more profiles 183, however, the method can include multiple profiles, users, registrations, etc. It is envisioned that a plurality of users or a group of users can register and provide profiles using the control system for use according to the method and system of the present disclosure.

Still Further Embodiments and Examples

It is understood that the features shown in some of the FIGS., for example block diagrams, are functional representations of features of the present disclosure. Such features are shown in embodiments of the systems and methods of the present disclosure for illustrative purposes to clarify the functionality of features of the present disclosure.

The methods and systems of the present disclosure can include a series of operation blocks for implementing one or more embodiments according to the present disclosure. In some examples, operational blocks of one or more FIGS. may be similar to operational blocks shown in another figure. A method shown in one FIG. may be another example embodiment which can include aspects/operations shown in another FIG. and discussed previously.

Additional Embodiments and Examples

Account data, for instance, including profile data related to a user, and any data, personal or otherwise, can be collected and stored, for example, in the control system 170. It is understood that such data collection is done with the knowledge and consent of a user, and stored to preserve privacy, which is discussed in more detail below. Such data can include personal data, and data regarding personal items.

In one example a user can register 182 have an account 181 with a user profile 183 on a control system 170, which is discussed in more detail below. For example, data can be collected using techniques as discussed above, for example, using cameras, and data can be uploaded to a user profile by the user. A user can include, for example, a corporate entity, or department of a business, or a homeowner, or any end user, a human operator, or a robotic device, or other personnel of a business.

Regarding collection of data with respect to the present disclosure, such uploading or generation of profiles is voluntary by the one or more users, and thus initiated by and with the approval of a user. Thereby, a user can opt-in to establishing an account having a profile according to the present disclosure. Similarly, data received by the system or inputted or received as an input is voluntary by one or more users, and thus initiated by and with the approval of the user. Thereby, a user can opt-in to input data according to the present disclosure. Such user approval also includes a user's option to cancel such profile or account, and/or input of data, and thus opt-out, at the user's discretion, of capturing communications and data. Further, any data stored or collected is understood to be intended to be securely stored and unavailable without authorization by the user, and not available to the public and/or unauthorized users. Such stored data is understood to be deleted at the request of the user and deleted in a secure manner. Also, any use of such stored data is understood to be, according to the present disclosure, only with the user's authorization and consent.

In one or more embodiments of the present invention, a user(s) can opt-in or register with a control system, voluntarily providing data and/or information in the process, with the user's consent and authorization, where the data is stored and used in the one or more methods of the present disclosure. Also, a user(s) can register one or more user electronic devices for use with the one or more methods and systems according to the present disclosure. As part of a registration, a user can also identify and authorize access to one or more activities or other systems (e.g., audio and/or video systems). Such opt-in of registration and authorizing collection and/or storage of data is voluntary and a user may request deletion of data (including a profile and/or profile data), un-registering, and/or opt-out of any registration. It is understood that such opting-out includes disposal of all data in a secure manner. A user interface can also allow a user or an individual to remove all their historical data.

Other Additional Embodiments and Examples

In one example, Artificial Intelligence (AI) can be used, all or in part, for generating a model or a learning model as discussed herein in embodiments of the present disclosure. An Artificial Intelligence (AI) System can include machines, computer, and computer programs which are designed to be intelligent or mirror intelligence. Such systems can include computers executing algorithms. AI can include machine learning and deep learning. For example, deep learning can include neural networks. An AI system can be cloud based, that is, using a cloud-based computing environment having computing resources.

In another example, the control system 170 can be all or part of an Artificial Intelligence (AI) system. For example, the control system can be one or more components of an AI system.

It is also understood that the method 100 according to an embodiment of the present disclosure, can be incorporated into (Artificial Intelligence) AI devices, components or be part of an AI system, which can communicate with respective AI systems and components, and respective AI system platforms. Thereby, such programs or an application incorporating the method of the present disclosure, as discussed above, can be part of an AI system. In one embodiment according to the present invention, it is envisioned that the control system can communicate with an AI system, or in another example can be part of an AI system. The control system can also represent a software application having a front-end user part and a back-end part providing functionality, which can in one or more examples, interact with, encompass, or be part of larger systems, such as an AI system. In one example, an AI device can be associated with an AI system, which can be all or in part, a control system and/or a content delivery system, and be remote from an AI device. Such an AI system can be represented by one or more servers storing programs on computer readable medium which can communicate with one or more AI devices. The AI system can communicate with the control system, and in one or more embodiments, the control system can be all or part of the AI system or vice versa.

It is understood that as discussed herein, a download or downloadable data can be initiated using a voice command or using a mouse, touch screen, etc. In such examples a mobile device can be user initiated, or an AI device can be used with consent and permission of users. Other examples of AI devices include devices which include a microphone, speaker, and can access a cellular network or mobile network, a communications network, or the Internet, for example, a vehicle having a computer and having cellular or satellite communications, or in another example, IoT (Internet of Things) devices, such as appliances, having cellular network or Internet access.

Further Discussion Regarding Examples and Embodiments

It is understood that a set or group is a collection of distinct objects or elements. The objects or elements that make up a set or group can be anything, for example, numbers, letters of the alphabet, other sets, a number of people or users, and so on. It is further understood that a set or group can be one element, for example, one thing or a number, in other words, a set of one element, for example, one or more users or people or participants. It is also understood that machine and device are used interchangeable herein to refer to machine or devices in one or more AI ecosystems or environments.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Such examples are intended to be examples or exemplary, and non-exhaustive. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further Additional Examples and Embodiments

Referring to FIG. 6, an embodiment of system or computer environment 1000, according to the present disclosure, includes a computer system 1010 shown in the form of a generic computing device. The method 100, for example, may be embodied in a program 1060, including program instructions, embodied on a computer readable storage device, or a computer readable storage medium, for example, generally referred to as computer memory 1030 and more specifically, computer readable storage medium 1050. Such memory and/or computer readable storage media includes non-volatile memory or non-volatile storage, also known and referred to non-transient computer readable storage media, or non-transitory computer readable storage media. For example, such non-volatile memory can also be disk storage devices, including one or more hard drives. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, the system or computer environment 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure. It is also understood that a control system 170, communicating with a computer system, can include all or part of the computer system 1010 and its components, and/or the control system can communicate with all or part of the computer system 1010 and its components as a remote computer system, to achieve the control system functions described in the present disclosure. The control system function, for example, can include storing, processing, and executing software instructions to perform the functions of the present disclosure. It is also understood that the one or more computers or computer systems shown in FIG. 1 similarly can include all or part of the computer system 1010 and its components, and/or the one or more computers can communicate with all or part of the computer system 1010 and its components as a remote computer system, to achieve the computer functions described in the present disclosure.

In an embodiment according to the present disclosure, one or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions. For example, in one embedment according to the present disclosure, a program embodying a method is embodied in, or encoded in, a computer readable storage medium, which includes and is defined as, a non-transient or non-transitory computer readable storage medium. Thus, embodiments or examples according to the present disclosure, of a computer readable storage medium do not include a signal, and embodiments can include one or more non-transient or non-transitory computer readable storage mediums. Thereby, in one example, a program can be recorded on a computer readable storage medium and become structurally and functionally interrelated to the medium.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. A power supply 1090 can also connect to the computer using an electrical power supply interface (not shown). Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

Other Aspects and Examples

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Additional Aspects and Examples

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
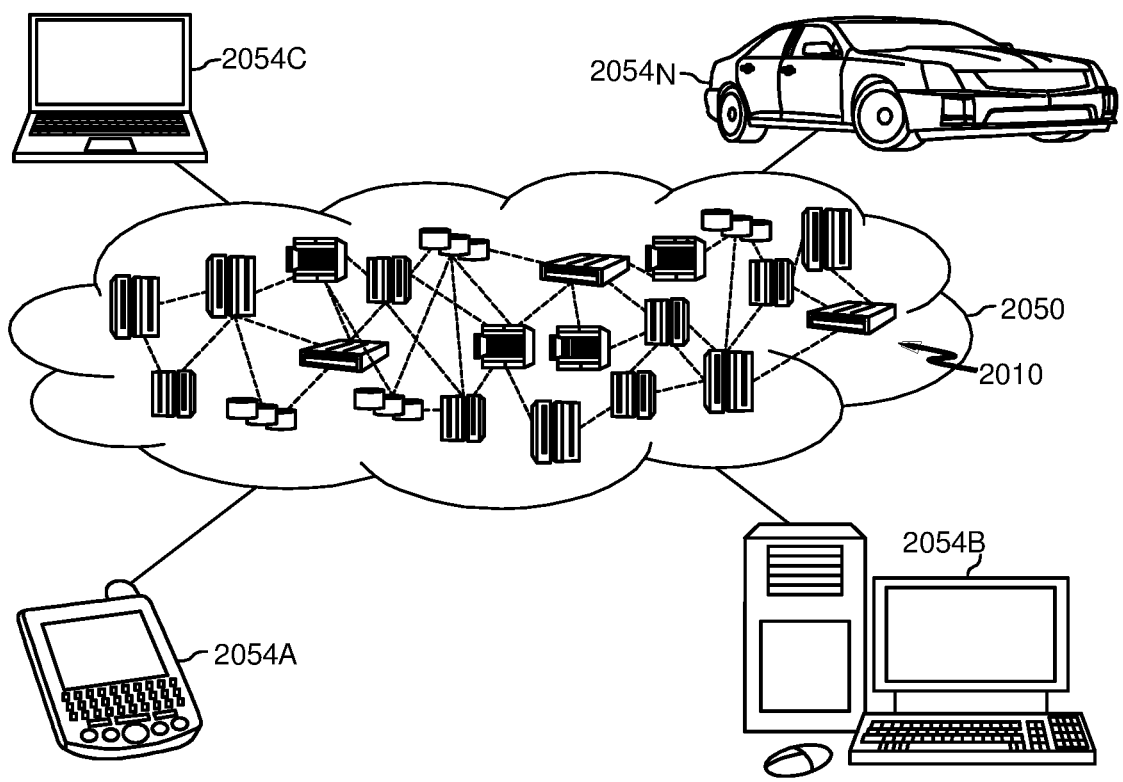
FIG. 7 is a block diagram depicting a cloud computing environment according to an embodiment of the present invention.

Referring now to FIG. 7, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 7 are intended to be illustrative only and that computing nodes 2010 and cloud computing environment 2050 can communicate with any type of computerized device over any type of network and/or network addressable connection (e.g., using a web browser).

Figure 8:
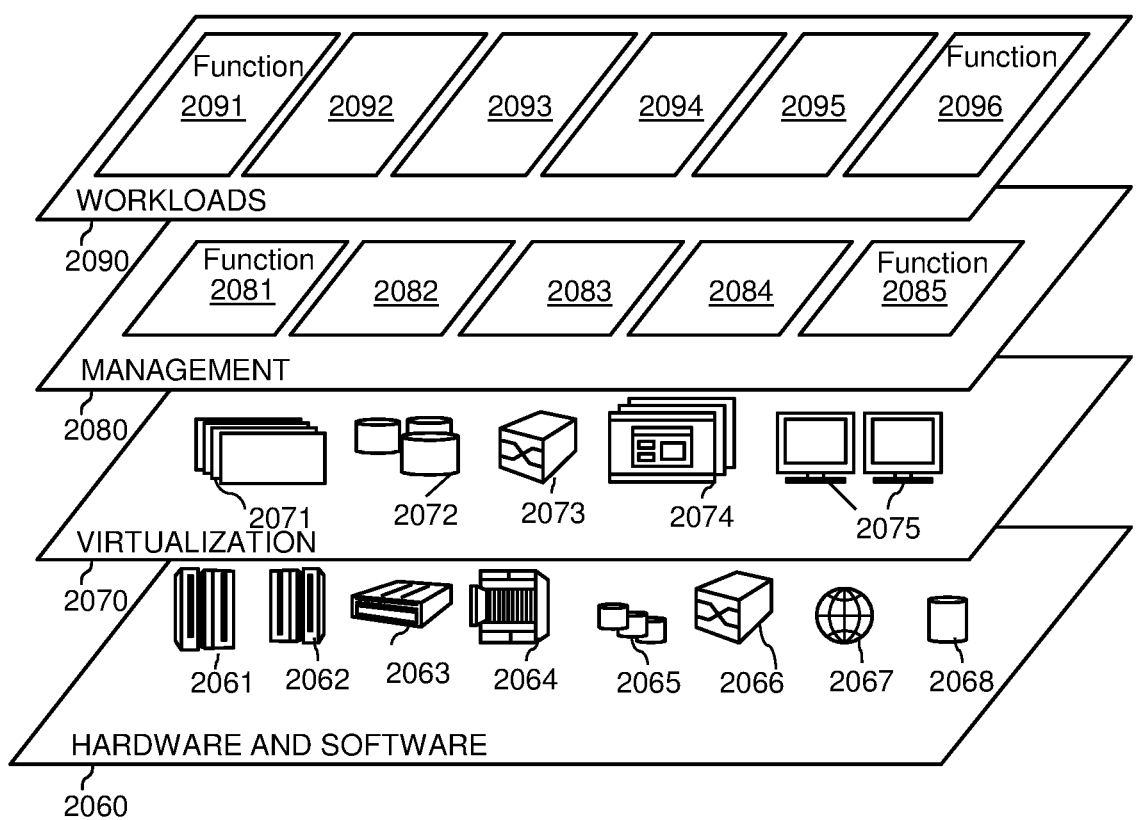
FIG. 8 is a block diagram depicting abstraction model layers according to an embodiment of the present invention.

Referring now to FIG. 8, a set of functional abstraction layers provided by cloud computing environment 2050 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and automatically initiating electronic communications using a mobile device 2096, for example, changing a setting on the mobile device to open location sharing.

What is claimed is:

1. A computer-implemented method for automatically initiating electronic communications including location sharing on a device in response to detecting a risk situation, comprising:
   initiating an emergency protocol on a mobile device, using a computer, in response to detecting by the mobile device a risk event;
   changing a setting on the mobile device, as part of the emergency protocol, the detecting of the risk event being based on data received at the mobile device regarding a person using the mobile device, and the changing of the setting includes enabling location sharing for the mobile device;
   detecting and modifying user devices, as part of the emergency protocol, from a closed non-broadcasting mode, to an open communication mode;
   pushing a command through a joinable mesh network of devices in an emergency mode; opening the devices for communications thereby forming a mesh network, the mesh network growing in size by the number of devices being in emergency mode; and
   providing metrics by passing location service information through the mesh network.

2. The method of claim 1, further comprising:
   enabling wireless communication by the mobile device, in response to the detecting of the risk event, the enabling of the wireless communication includes changing of a communications setting in the mobile device.

3. The method of claim 1, wherein the risk event is an emergency situation.

4. The method of claim 1, wherein the emergency protocol can include turning on a light on the mobile device or activating an audible sound on the mobile device.

5. The method of claim 1, wherein the data is derived from one or more sensors and the one or more sensors include biometric sensors and the data includes biometric data for the person.

6. The method of claim 1, wherein the data for detecting the emergency is local data from one or more local sensors on the mobile device.

7. The method of claim 6, wherein one of the sensors of the one or more sensors is an accelerometer and the local data includes accelerometer data.

8. The method of claim 1, wherein the data is derived from one or more remote sensors remote from the mobile device.

9. The method of claim 1, further comprising:
   pushing a command, by a remote system communicating with the mobile device, to the mobile device to change the setting on the mobile device.

10. The method of claim 1, further comprising:
    pushing a command, by a remote system communicating with the mobile device, to the mobile device to change another setting on the mobile device to allow wireless communication with the mobile device over a wireless system in response to the remote system detecting an emergency.

11. The method of claim 1, further comprising:
    changing a setting on the mobile device for audible sounds or visual effects to activate a sound or a light from the mobile device.

12. The method of claim 3, further comprising:
    enabling wireless communication with the mobile device, in response to the detecting of the emergency situation; and
    connecting the mobile device to a network of devices.

13. The method of claim 1, further comprising:
    determining a location of the mobile device using a wireless communication signal of the mobile device.

14. The method of claim 1, further comprising:
    determining a location of the mobile device using a wireless communications signal of the mobile device; and
    initiating communication between the mobile device and a remote system based on the wireless communication signal.

15. The method of claim 14, wherein the communication between the mobile device and the remote system includes activating voice communications allowing the person to verbally communicate with a remote operator.

16. The method of claim 1, further comprising:
    enabling wireless communications on a mobile device, as at least part of the initiating of the emergency protocol on the mobile device, using a computer of the mobile device, and the enabling of the wireless communication includes changing a communications setting on the mobile device, as at least part of the changing of the setting, in response to the detecting of the emergency;
    initiating location sharing for the mobile device in response to the enabling of the wireless communications; and
    connecting the mobile device to a network of devices.

17. The method of claim 1, further comprising:
    generating a model, using the computer; the model including the following;
    updating the initiating of the emergency protocol on the mobile device, using the computer, in response to the detecting by the mobile device of the risk event; and
    initiating a second change of a second setting on the mobile device, as part of the emergency protocol, the detecting of the risk event being based on the data received at the mobile device regarding the person using the mobile device, and the second setting including enabling location sharing for the device.

18. The method of claim 17, further comprising:
    iteratively generating the model to produce updated models.

19. A system for automatically initiating electronic communications including location sharing on a device in response to detecting a risk situation, which comprises:
    a computer system comprising; a computer processor, a computer-readable storage medium, and program instructions stored on the computer-readable storage medium being executable by the processor, to cause the computer system to perform the following functions to;
    initiate an emergency protocol on a mobile device, using a computer, in response to detecting by the mobile device a risk event;
    change a setting on the mobile device, as part of the emergency protocol, the detecting of the risk event being based on data received at the mobile device regarding a person using the mobile device, and the changing of the setting includes enabling location sharing for the mobile device; detect and modify user devices, as part of the emergency protocol, from a closed non-broadcasting mode, to an open communication mode;
    push a command through a joinable mesh network of devices in an emergency mode; opening the devices for communications thereby forming a mesh network, the mesh network growing in size by the number of devices being in emergency mode; and
    provide metrics by passing location service information through the mesh network.

20. A computer program product for automatically initiating electronic communications including location sharing on a device in response to detecting a risk situation, the computer program product comprising a computer readable storage medium having program instructions embodied therewith, the program instructions executable by a computer to cause the computer to perform functions, by the computer, comprising the functions to;
- initiate an emergency protocol on a mobile device, using a computer, in response to detecting by the mobile device a risk event;
- change a setting on the mobile device, as part of the emergency protocol, the detecting of the risk event being based on data received at the mobile device regarding a person using the mobile device, and the changing of the setting includes enabling location sharing for the mobile device;
- detect and modify user devices, as part of the emergency protocol, from a closed non-broadcasting mode, to an open communication mode;
- push a command through a joinable mesh network of devices in an emergency mode; opening the devices for communications thereby forming a mesh network, the mesh network growing in size by the number of devices being in emergency mode; and
- provide metrics by passing location service information through the mesh network.

* * * * *